United States Patent
Hutchison (12)

(10) Patent No.: US 6,573,475 B2
(45) Date of Patent: Jun. 3, 2003

(54) WELDING POWER SUPPLY WITH OUTPUT INDUCTOR

(75) Inventor: Richard M. Hutchison, New London, WI (US)

(73) Assignee: Illinois Tool Works Inc., Glenview, IL (US)

( * ) Notice: Subject to any disclaimer, the term of this patent is extended or adjusted under 35 U.S.C. 154(b) by 23 days.

(21) Appl. No.: 09/884,236

(22) Filed: Jun. 19, 2001

(65) Prior Publication Data

US 2002/0190041 A1 Dec. 19, 2002

(51) Int. Cl.[7] .................................................. B23K 9/10
(52) U.S. Cl. ............................. 219/130.4; 219/137 PS
(58) Field of Search ........................... 219/130.1, 130.4, 219/137 PS, 130.21, 130.31, 130.32, 130.33

(56) References Cited

U.S. PATENT DOCUMENTS

| | | | | |
|---|---|---|---|---|
| 2,464,679 A | * | 3/1949 | Fletcher et al. | 219/130.1 |
| 3,242,312 A | * | 3/1966 | Pierce | 219/130.31 |
| 3,253,119 A | * | 5/1966 | Manz | 219/130.4 |
| 3,291,960 A | * | 12/1966 | Folkhard et al. | 219/130.1 |
| 3,440,395 A | * | 4/1969 | Rebuffoni et al. | 219/130.4 |
| 6,087,626 A | * | 7/2000 | Hutchison et al. | 219/130.21 |

OTHER PUBLICATIONS

Millermatic 250 Miller The Power of Blue Owner's Manual Mar. 1998.
Millermatic 250MP Miller The Power of Blue Owner's Manual Jan. 1997.
Millermatic 250X Miller The Power of Blue Owner's Manual Oct. 2000.
Millermatic 250X with Meters and M–25 Gun Miller The Power of Blue Owner's Manual Jan. 2001.

* cited by examiner

*Primary Examiner*—Clifford C. Shaw
(74) *Attorney, Agent, or Firm*—George R. Corrigan

(57) ABSTRACT

A method and apparatus that provides welding-type power is disclosed. It includes a power source, a welding output, an inductor winding and an auxiliary winding. The inductor winding is in electrical communication with the power source and the welding output. The auxiliary winding is preferably in magnetic communication with the inductor winding, and in electrical communication with the power source and the welding output. A switch is in electrical communication with the auxiliary winding, a controller with a control output is connected to the switch, the auxiliary winding is anti-parallel with the inductor winding in the preferred embodiment. The auxiliary winding may be used to create a variable output inductance.

20 Claims, 4 Drawing Sheets

WELDING POWER SUPPLY WITH OUTPUT INDUCTOR

FIELD OF THE INVENTION

The present invention relates generally to the art of welding power supplies. More specifically, it relates to welding power supplies having an output inductor.

BACKGROUND OF THE INVENTION

There are a wide variety of welding processes and welding power supplies. Welding power supply or system as used herein includes one or more of the following components: a wire feeder, a power source or source of power, a torch or gun, a wire feeder controller, and a power source controller to control the various components (it may also exclude some of these components, such as the power source).

Many known welding power supplies have a power source followed by an output inductor (or choke). Output inductor, as used herein, includes an inductor between the switches that control the power and the welding output. The inducting effect (inducting, as used herein, includes inducing a magnetic field when current flows) of the output inductor lowers di/dt, thus generally smoothing the output, and maintaining and stabilizing the arc.

However, when the arc is being initiated a high di/dt is desired. The output inductor, which lowers di/dt, has the undesired effect of inhibiting or slowing arc-starting. Accordingly, many prior art welding power supplies provide a second winding on the inductor core.

One such prior art welding power supply is a Miller DeltaWeld®, and a diagram of the main and auxiliary inductor windings is shown in FIG. 1. A power source 101 provides power through an inductor winding 103 to a welding output 105. Power source, or source of power, as used herein, includes the power circuitry such as rectifiers, switches, transformers, SCRs, etc that process and provide the output power.

An auxiliary inductor winding 107 is in magnetic communication, but not electrical communication, with inductor winding 103. A mechanical contactor 109 is in series with the ends of auxiliary winding 107, such that when closed, contactor 109 shorts auxiliary winding 107.

Inductor winding, as used herein, includes a winding that induces a magnetic field when current flows therein. Magnetic communication, as used herein, includes a magnetic connection wherein a magnetic field influencing one winding, influences the other winding. Electrical communication with, as used herein, includes a connection wherein electrical signals and/or power may be provided or received.

The arrangement helps start an arc because contactor 109 is closed when arc-starting, and opened after the arc is established (current is detected to determine the arc-state). The common core shared by windings 103 and 107 cause a voltage to be induced across winding 107 (when contactor 109 is closed) and a resultant current to flow. The B-field produced by the current flowing in auxiliary winding 107 will be in opposition to the flux produced by the weld current flowing in inductor winding 103. This counteracting flux re-balances, to some extent, the core to zero flux (neglecting exciting current) and thereby greatly reduces the effect of the iron core material. This results in a substantial reduction of inductance at the start, and a substantial increase in di/dt.

However, there will occasionally be difficulty in starting the arc even with the shorting winding. Accordingly, it is desirable to provide a system for welding that provides easier starting, preferably by providing an increased di/dt.

Another shortcoming of the prior art is that the output inductor has a constant value. Some welding processes would benefit from a variable output inductance, so that the di/dt may be controlled consistent with desired changes in the welding output. Accordingly, it is desirable to provide a system for welding that provides a variable output inductance.

SUMMARY OF THE PRESENT INVENTION

According to a first aspect of the invention a welding-type power supply includes a power source, a welding output, an inductor winding and an auxiliary winding. The inductor winding is in electrical communication with the power source and the welding output. The auxiliary winding is in magnetic communication with the inductor winding, and in electrical communication with the power source and the welding output.

According to a second aspect of the invention a welding-type power supply includes a power source, and a welding output. An inductor winding and an auxiliary winding are in electrical communication with the power source and the welding output. The auxiliary winding is not in magnetic communication with the inductor winding.

A switch is in electrical communication with the auxiliary winding, a controller with a control output is connected to the switch, and/or the auxiliary winding is anti-parallel with the inductor winding in various embodiments. The controller may include an arc-state circuit with an output that is the control output.

According to a third aspect of the invention a method of initiating a welding arc includes providing welding-type power to an inductor winding and to an auxiliary winding in magnetic communication with the inductor winding. The welding-type power is provided from the inductor winding and the auxiliary winding to a welding output. Welding-type power is not provided to the auxiliary winding after an arc is established.

According to a fourth aspect of the invention a method of initiating a welding arc includes providing welding-type power to an inductor winding and an auxiliary winding. The auxiliary winding is not in magnetic communication with the inductor winding. Welding-type power is provided from the inductor winding and the auxiliary winding to a welding output. Welding-type power is no longer provided to the auxiliary winding when an arc is established. The presence and absence of at least one of an arc and an output short circuit is sensed in an alternative embodiment.

According to a fifth aspect of the invention a welding-type power supply includes a power source and a welding output. A variable inductance inductor is in electrical communication with the power source and the welding output.

The inductor includes an output winding and an auxiliary winding, both in electrical communication with the power source and the welding output and/or the auxiliary winding is in magnetic communication with the output winding in various embodiments.

The system includes a switch in electrical communication with the auxiliary winding, and may includes a capacitor in series with the switch and the auxiliary winding, in other alternatives.

The auxiliary winding is anti-parallel with the output winding in yet another embodiment Other principal features and advantages of the invention will become apparent to those skilled in the art upon review of the following drawings, the detailed description and the appended claims.

Figure 1:
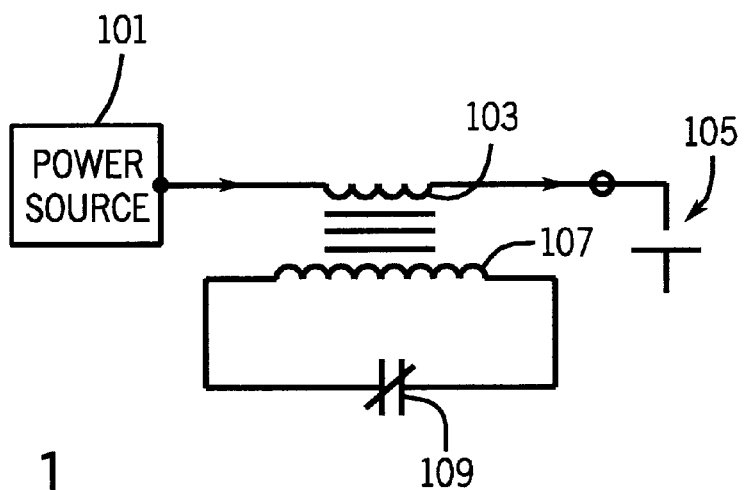
FIG. 1 is a diagram showing a prior art output inductor.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to a particular welding system, and implemented with particular components, it should be understood at the outset that the invention can also be implemented with other systems components and arrangements.

Generally, the present invention is implemented with a system that provides welding-type power, and is particularly suited for MIG welding. Welding-type power, as used herein, refers to welding, plasma cutting or induction heating power. The system includes an output inductor having an auxiliary winding (in addition to the main winding) wherein the auxiliary winding is in both electrical communication and magnetic communication with the main winding. This allows for higher di/dt than prior art arrangements having the auxiliary winding not in electrical communication with the main winding.

Figure 2:
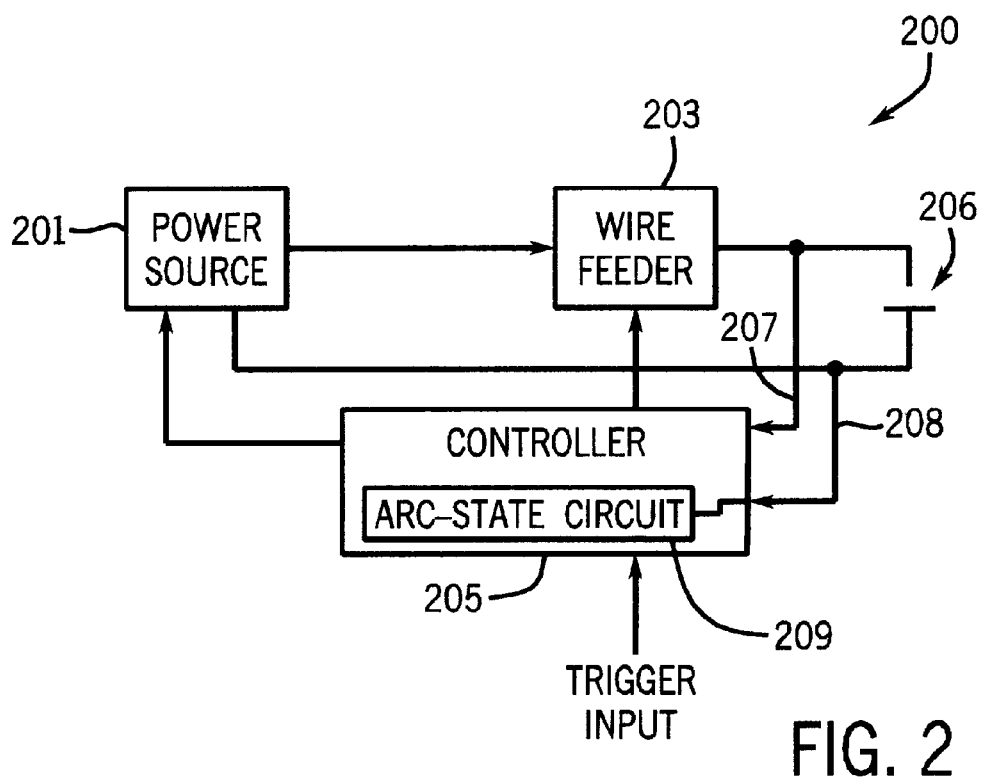
FIG. 2 is a diagram showing a welding system in accordance with the present invention.

The preferred embodiment will be described as being implemented with a welding system similar to a prior art MM250® welding power supply. Generally, such a welding system 200 is shown in FIG. 2 and includes a power source 201, a wire feeder 203 and a controller 205, which cooperate to provide a welding output to an arc 206. Welding output, as used herein, refers to an output which is suitable for welding, or which would be suitable for welding after rectification, filtering, conversion, or other power manipulation.

Controller 205 receives feedback on lines 207 and 208, which can be used to indicate output voltage, current, power, or functions thereof. Controller 205 provides control outputs to power supply 201 and wire feeder 205 that controls them consistent with prior art control schemes. Control output, as used herein, includes an output used to control a power supply, such as a setpoint, gate signals, phase control signals, etc. Controller, as used herein, includes digital and analog, circuitry, discrete or integrated circuitry, microprocessors, DSPs, etc., and software, hardware and firmware, located on one or more boards, used to control a device such as a power supply.

Controller 205 includes a trigger input that indicates the user is intent to begin welding. Controller 205 also includes an arc-state circuit 209 that compares output current to a threshold. When the output current rises above a threshold, the arc state circuit provides a signal that indicates the arc has been established. Arc-state circuit, as used herein, includes a circuit that senses the state of the welding output, i.e., whether there is an arc or a short circuit output. Circuit, as used herein, includes analog and/or digital components, and/or a microprocessor or a portion thereof.

Controller 205 closes a switch, placing an auxiliary winding in electrical communication with the main winding upon receipt of the trigger signal, and opens the switch when the arc is established, as will be described in greater detail below.

Controller 205 is a digital controller in the preferred embodiment, but is an analog controller in alternative embodiments.

Figure 3:
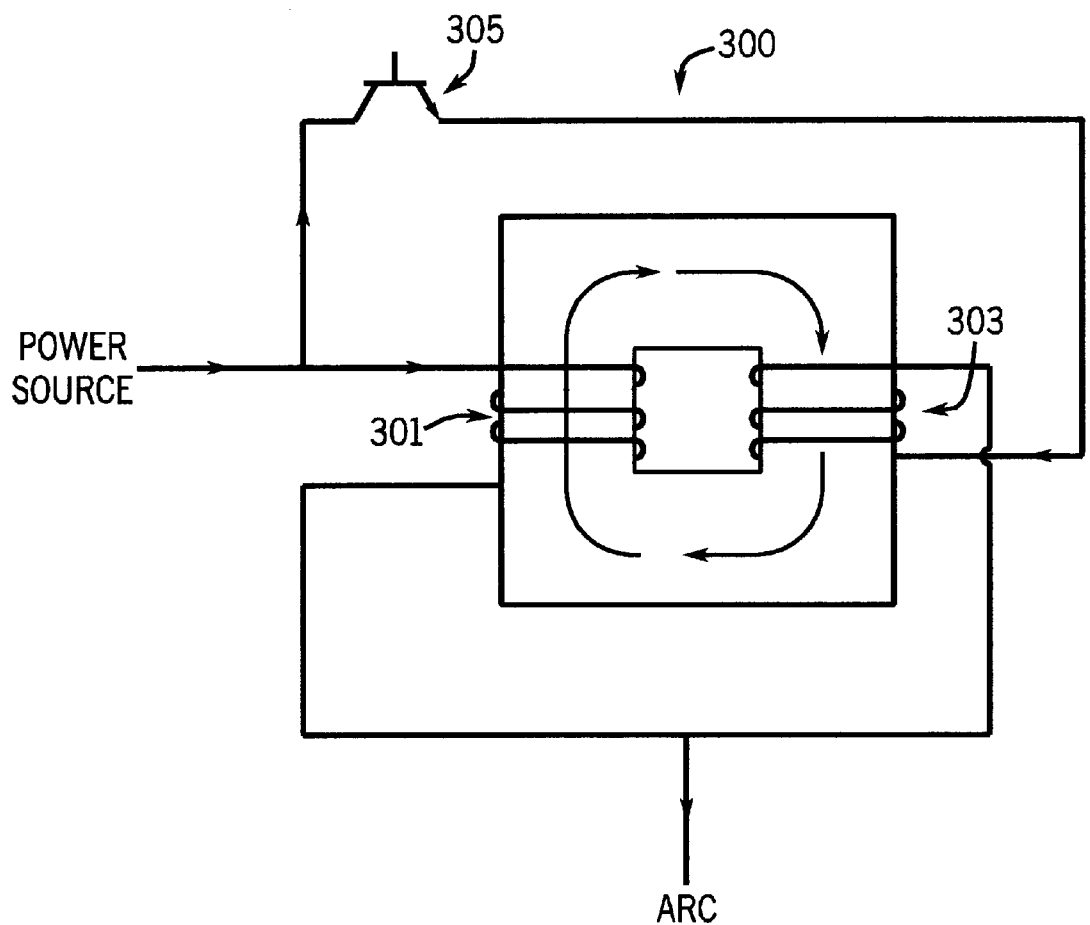
FIG. 3 is a diagram showing an output inductor in accordance with the present invention.

FIG. 3 shows an inductor 300 (typically disposed within the housing of power source 201) having a main winding 301 and an auxiliary winding 303, in accordance with the present invention. A switch 305 (preferably an IGBT, but alternatively a digital switch, a contactor, or other type switch) is in series with auxiliary winding 303, between auxiliary winding 303 and the power source. Switch refers to one or more switches commonly controlled. Alternative embodiments include a switch between auxiliary winding 303 and the arc, either to work with or instead of switch 305.

Prior to the trigger being pulled by the user, switch 305 is closed and auxiliary winding 303 is in electrical contact with winding 301. When the trigger is pulled, controller 205 causes power source 201 to provide output power. The output power causes current to flow through winding 301. Also, the power causes current to flow in auxiliary winding 303. Current is further induced in auxiliary winding 303 by the current flowing in winding 301.

Winding 303 is in anti-parallel with winding 301, as shown in FIG. 3. Thus, current flowing in the windings from the power source to the arc produces flux in opposite directions. Anti-parallel windings, as used herein, includes windings having dot polarities opposite one another for current flow in the same electrical direction.

The anti-parallel arrangement provides a benefit that the flux produced by winding 303 from the current flowing from the power source is in the same direction as the flux produced by the current induced in winding 303 by current flowing in winding 301. These fluxes oppose the flux created by winding 301. This results in an even faster di/dt through the inductor, thereby, improving arc initiation.

Figure 4:
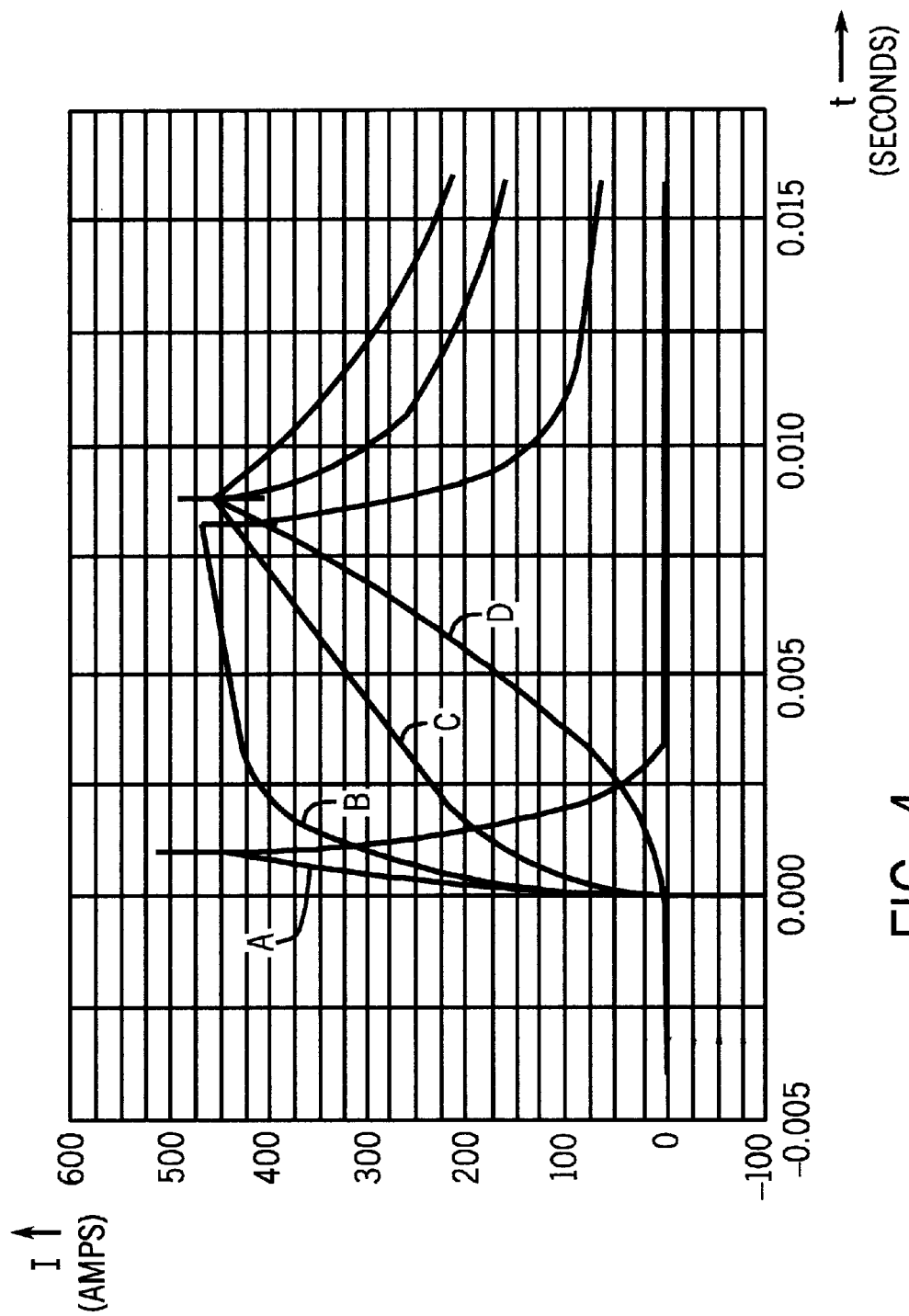
FIG. 4 is a graph showing di/dt for a various output windings.

The benefit may be easily seen in the graphs of FIG. 4, which show the rate of rise of current (di/dt) through the stabilizer (the main inductor winding) for different configurations of the main and auxiliary windings. All arrangements were using an output inductor of about 25 turns. Graph A shows a the rise time for a 60 turn auxiliary winding connected in accordance with this invention, and as shown in FIG. 3. Graph B shows a rise time for a 60 turn winding in magnetic communication, but not in electrical communication with the main winding (as in the prior art). Graph C shows a the rise time for a 60 turns auxiliary winding connected in electrical and magnetic communication, but parallel with the main winding. Graph D shows a the rise time without an auxiliary winding. It is readily seen that the preferred embodiment provides a faster rise time (greater di/dt).

Another aspect of this invention provides for a variable output inductance. Generally, the output inductance can be varied by turning on and off switch 305.

Figure 5:
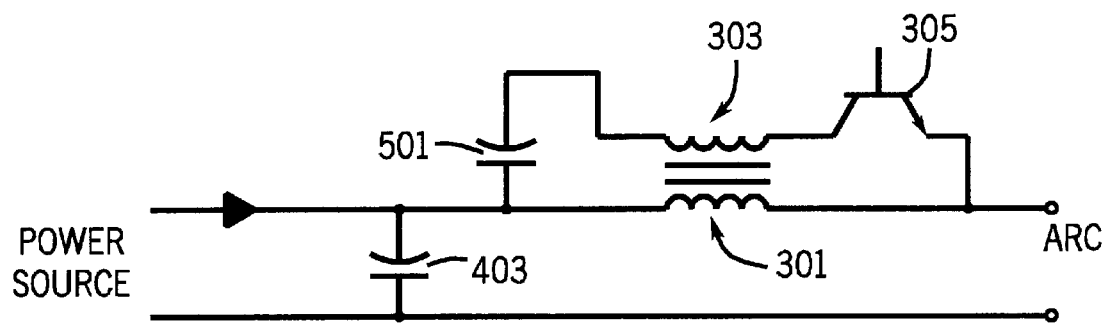
FIG. 5 is a diagram showing a variable output inductor in accordance with the present invention.

FIG. 5 shows a circuit that enhances the variable inductance feature. A series capacitor 501 is added in series with auxiliary winding 305 (main capacitor 403 is used in the prior art and is not unique to the invention). The addition of series capacitor 501 aids in producing a variable inductance that can be adjusted for different wire types, sizes, weld conditions etc. A potentiometer on the front panel can be used to control the on/off time of switch 305, and thus control the variable inductance.

Figure 6:
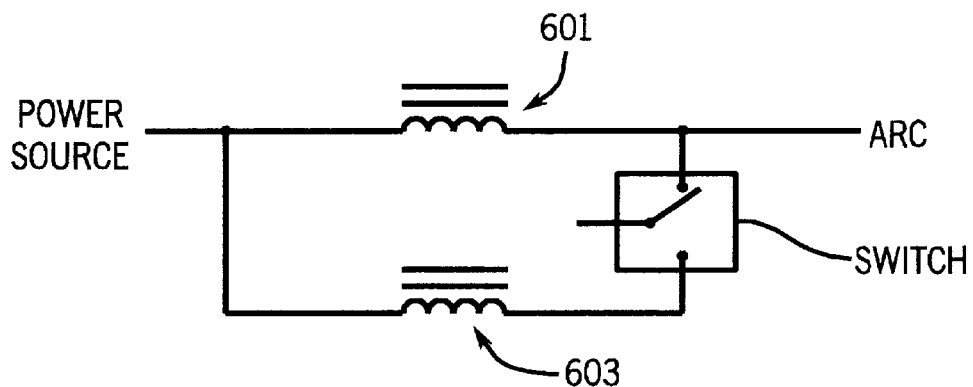
FIG. 6 is a diagram of one embodiment of the present invention.

An alternative embodiment is shown in FIG. 6, wherein an auxiliary winding 603 is on a different core than the main winding 601. Thus the auxiliary winding is in electrical communication with the main winding, but not in magnetic communication with the main winding. Other alternatives include the inductor being disposed elsewhere within power source 201.

Numerous modifications may be made to the present invention which still fall within the intended scope hereof. Thus, it should be apparent that there has been provided in accordance with the present invention a method and apparatus for welding that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A welding-type power supply, comprising:
    a power source;
    a welding output;
    an inductor winding in electrical communication with the power source and the welding output; and
    an auxiliary winding in magnetic communication with the inductor winding, and in electrical communication with the power source and the welding output, and anti-parallel with the inductor winding.

2. The welding-type power system of claim 1, further comprising a switch in electrical communication with the auxiliary winding.

3. The welding-type power system of claim 1, further comprising a controller having a control output connected to the switch.

4. The welding-type power system of claim 3, wherein the controller includes an arc-state circuit having an output that is the control output.

5. A welding-type power supply, comprising:
    power means for providing welding power;
    a welding output;
    inductor means for inducting, in electrical communication with the power means and the welding output; and
    auxiliary inductor means for inducting, in magnetic communication with the inductor means, and in electrical communication with the power means and the welding output, and anti-parallel with the inductor means.

6. The welding-type power system of claim 5, further comprising a switch means for removing the electrical communication between the auxiliary inductor means and at least one of the inductor means and the welding output.

7. The welding-type power system of claim 6, further comprising control means for controlling the switch, connected to the switch.

8. The welding-type power system of claim 7, wherein the control means includes means for sensing the presence and absence of at least one of an arc and an output short circuit.

9. A method of initiating a welding arc, comprising:
    providing welding-type power to an inductor winding;
    providing the welding-type power to an auxiliary winding in magnetic communication with the inductor winding, and anti-parallel to the inductor winding;
    providing the welding-type power from the inductor winding and the auxiliary winding to a welding output; and
    ceasing the providing of welding-type power to the auxiliary winding in the event an arc is established.

10. The method of claim 9, further comprising sensing the presence and absence of at least one of an arc and an output short circuit.

11. A welding-type power supply, comprising:
    a power source;
    a welding output;
    an inductor winding in electrical communication with the power source and the welding output, and
    an auxiliary winding in electrical communication with the power source and the welding output, but not in magnetic communication with the inductor winding, and electrically in parallel with the inductor winding.

12. The welding-type power system of claim 11, further comprising a switch in electrical communication with the auxiliary winding.

13. The welding-type power system of claim 12, further comprising a controller having a control output connected to the switch, wherein the controller includes an arc-state circuit having an output that is the control output.

14. A method of initiating a welding arc, comprising:

providing welding-type power to an inductor winding;

providing the welding-type power to an auxiliary winding not in magnetic communication with the inductor winding; and combining the welding-type power from the inductor winding and the auxiliary winding to provide a welding output;

ceasing the providing of welding-type power to the auxiliary winding in the event an arc is established.

15. A welding-type power supply, comprising:

a power source;

a welding output;

a variable inductance inductor, including an inductor in series with a capacitor in electrical communication with the power source and the welding output.

16. The welding-type power supply of claim 15, wherein the inductor includes an output winding and an auxiliary winding, both in electrical communication with the power source and the welding output.

17. The welding-type power supply of claim 16, wherein the auxiliary winding is in magnetic communication with the output winding.

18. The welding-type power system of claim 17, further comprising a switch in electrical communication with the auxiliary winding.

19. The welding-type power system of claim 16, wherein the auxiliary winding is anti-parallel with the output winding.

20. A welding-type power supply, comprising:

power means for providing power;

output means for providing a welding output; and inductor means, including an inductor in series with a capacitor for providing a variable inductance, in electrical communication with the power means and the output means.

* * * * *